(12) United States Patent
Flanagan (10) Patent No.: US 7,411,517 B2
(45) Date of Patent: Aug. 12, 2008

(54) APPARATUS AND METHOD FOR PROVIDING COMMUNICATION BETWEEN A PROBE AND A SENSOR

(75) Inventor: William D. Flanagan, Houston, TX (US)

(73) Assignee: Ultima Labs, Inc., Houston, TX (US)

( * ) Notice: Subject to any disclaimer, the term of this patent is extended or adjusted under 35 U.S.C. 154(b) by 112 days.

(21) Appl. No.: 11/159,793

(22) Filed: Jun. 23, 2005

(65) Prior Publication Data

US 2006/0290529 A1 Dec. 28, 2006

(51) Int. Cl.
*G01V 3/00* (2006.01)
(52) U.S. Cl. .............. 340/854.4; 340/854.6; 340/854.8; 175/40
(58) Field of Classification Search .............. 340/854.4, 340/854.6, 854.3, 854.8; 166/375; 175/40
See application file for complete search history.

(56) References Cited

U.S. PATENT DOCUMENTS

| 2,370,818 | A | 3/1945 | Silverman |
| 3,727,616 | A | 4/1973 | Lenzkes |
| 4,539,992 | A | 9/1985 | Calfee et al. |
| 4,806,928 | A | 2/1989 | Veneruso |
| 4,901,069 | A | 2/1990 | Veneruso |
| 5,050,675 | A | 9/1991 | Upchurch |
| 5,241,961 | A | 9/1993 | Henry |
| 5,455,573 | A | 10/1995 | Delatorre |
| 6,392,561 | B1 | 5/2002 | Davies et al. |
| 6,540,032 | B1 | 4/2003 | Krueger |
| 7,046,164 | B2 * | 5/2006 | Gao et al. ................. 340/854.4 |
| 7,154,411 | B2 * | 12/2006 | Ciglenec et al. .......... 340/854.6 |

* cited by examiner

*Primary Examiner*—Albert K Wong
(74) *Attorney, Agent, or Firm*—Robert L. Waddell; Ted M. Anthony (57) ABSTRACT

A wireless data communication system for a down hole environment. The system includes a housing containing a sensor, positioned within a tubular, for collecting information and processing the information, a modulator for modulating the information from the sensor into an analog signal, and a sensor antenna electrically connected to the first modulator for generating a modulated electromagnetic wave. The system further includes a probe housing, concentrically disposed within the tubular, comprising a probe antenna for receiving the modulated electromagnetic wave and generating an output, and a demodulator for demodulating the electromagnetic wave received from the sensor to a digital record. A method of wirelessly communicating between a probe and a remote sensor is also disclosed.

22 Claims, 10 Drawing Sheets

APPARATUS AND METHOD FOR PROVIDING COMMUNICATION BETWEEN A PROBE AND A SENSOR

BACKGROUND OF THE INVENTION

This invention relates to an apparatus that provides communication between a probe and a sensor. More particularly, but not by way of limitation, this invention relates to an apparatus and method that provides communication between a probe located in the central bore of a drill collar and sensor electronics located in the drill collar wall.

In the course of drilling wells, an operator finds it necessary to learn geologic properties of the subterranean zones. Regardless of whether the zones contain hydrocarbons, the knowledge of specific features and characteristics of the various reservoirs is imperative for the economical exploitation of a field. One way to obtain geologic information of the formation is to lower a probe on a wire line. The probe may contain various sensors such as resistivity, gamma ray, gamma density, neutron porosity, pressure, etc. As those of ordinary skill in the art will recognize, the probes may be lowered in open hole situations intermittent of drilling operations, or in post drilling applications where the well contains casing. These type of operations are commonly referred to as well logging.

Another prior art technique is the use of sensors during actual drilling operations. Two techniques commonly used in the industry are logging while drilling (LWD) and measurement while drilling (MWD) devices. Both the LWD and MWD devices employ sensors that collects specific types of information, and wherein that information is transferred to a down hole processor. The down hole processor in turn transmits the information to the surface. The transmission media may be a cable that electrically connects the down hole processor to a surface processor. Alternatively, the transmission media may be the fluid column in the well, and wherein the down hole device contains a vibrating valve that transmits coded fluid pressure pulses that will be decoded at the surface.

Typically the MWD sensors are placed in a cylindrical probe that is located in the central bore of the drill collar. Theses sensors are not affected by the steel of the surrounding drill collar and are able to make measurements continuously while drilling. However, some of the LWD sensors and some of the newer generation MWD sensors can be strongly affected by the surrounding drill collar and have to be located in the external wall of the drill collar. Examples of LWD/MWD measurements that are affected by the drill collar are resistivity, annulus pressure, gamma density, and to some extent natural gamma ray. Quite often the drilling operation will make use of both MWD and LWD measurement systems. In these situations there can be sensors located in both the probe positioned in the central bore of the drill collar and sensors located in the external wall of the drill collar. As a result, some form of communication is required between these sensor systems to coordinate the measurement functions and transmit data to the surface.

Prior art techniques require that the probe located in the central bore of the drill collar and the sensors located in the collar wall contain a wired connection. However, wired connections are very problematic. Therefore, there is a need for a wireless link between the collar sensors and probe. More specifically, there is a need for an electromagnetic (EM) communication between an LWD/MWD probe located in the internal bore of a drill collar and sensor electronics located in the drill-collar wall. These, and many other needs will be met by the invention herein disclosed.

SUMMARY OF THE INVENTION

An apparatus for communicating a sensor to a probe is disclosed. The apparatus includes a sensor means, positioned within a pocket in a tubular string, for collecting information of the characteristic and processing the information, a first modem means for modulating the information from the sensor means into a signal, and a sensor antenna electrically connected to the first modem means for generating an electromagnetic wave. The apparatus further includes a probe antenna, concentrically disposed within the tubular string, for receiving the electromagnetic wave, and, a second modem means for demodulating the electromagnetic wave into the information.

In one preferred embodiment, the sensor means may measure the following properties: resistivity; gamma ray; or pressure. The sensor means may include a circuit for collecting an analog signal and generating a digital record. In one preferred embodiment, the operating frequency range of the sensor antenna and the probe antenna is between 10,000 hertz and 100,000 hertz. In the most preferred embodiment, the connection between the modem means and the probe means is a universal asynchronous receiver/transmitter (UART) interface, and the protocol of the UART is the RS 232 standard. Also, in one embodiment, there is some overlap in the axial direction of the probe antenna and the sensor antenna.

In the most preferred embodiment, the probe antenna is disposed about the outer periphery of the probe, and the sensor antenna is disposed about the inner tubular string. The length of one of the antennas can be made longer than then length of the other antenna so that the electromagnetic coupling between the antennas is less sensitive to axial misalignment of the two antennas. This makes positioning of the probe in the center bore of the collar less problematic. The well bore may contain a fluid column, and wherein the probe drives a fluid valve that transmits fluid pressure pulses indicative of the measured properties.

A method for communicating a sensor located within a tubing string with a probe concentrically disposed within the tubing string is also disclosed. The method comprises providing the sensor located within the tubing string, generating a reading from the sensor, and transmitting the reading to a first modem means. Next, the reading is converted to a modulated signal, and the modulated signal is directed to a tubing string antenna located within the tubing string, and an electromagnetic signal is generated with the tubing string antenna in response to the reading from the sensor.

The method includes receiving the propagating wave with a probe antenna located within the probe, and demodulating the electromagnetic wave (signal) within a second modem means to the reading. The reading is transmitted to a probe electronics module located within the probe. In one preferred embodiment, the sensor measures the characteristics of resistivity, gamma ray or pressure. The step of generating the reading from the sensor may include collecting an analog signal within a circuit and generating a digital record from the analog signal.

In a second embodiment, an apparatus for communicating a sensor with a control unit is disclosed. This apparatus comprises a housing containing the sensor, with the first housing having an opening therein, and a probe, slidably disposed within the opening. The apparatus includes a first circuit means, disposed within the housing, for receiving a reading generated by the sensor and generating an output reading, a first modem means, electrically connected with the first circuit means, for demodulating the output reading, and a housing antenna, electrically connected with the first modem means, for generating a modulated electromagnetic wave.

The second embodiment further includes a probe antenna, disposed about the probe, for receiving the modulated electromagnetic wave, a second modem means, electrically connected with the probe antenna, for converting the electromagnetic wave to the output reading, and a second circuit means, electrically connected with the second modem means and positioned within the probe, for processing and recording the output reading into a digital record. In the preferred embodiment, the probe antenna can generate modulated electromagnetic waves and wherein the housing antenna can receive the modulated electromagnetic waves. The second circuit means can generate an output command that is received by the second modem means, and wherein the second modem means modulates the output command that is received by the probe antenna for generation of the modulated electromagnetic wave, which in turn will be received by the housing antenna.

In one preferred embodiment, the probe antenna is disposed about the periphery of the probe, and the probe antenna comprises a non-metallic coil form; an antenna winding about the coil form, and a non-metallic shield covering the antenna winding. Also, the housing antenna may comprise a non-metallic coil form that is adjacent an inner pocket; an antenna winding placed about the non-metallic coil form; and a non-metallic shield covering the antenna winding.

As noted earlier, since the probe and sensor electronics are located in separate sealed pressure housings, a wired connection between them is problematic. An advantage of the present invention is that it allows bi-directional transfer of data between the probe and sensor electronics without the use of wires. The wireless communication link overcomes the prior art problems and eliminates the complexities of connecting wires between the probe and the collar electronics in the field.

Another advantage is that the disclosed method and apparatus allows a simple and cleaner field tool make-up, and wherein no wired connections are required to be made in the field. Also, another advantage of the disclosed method is a decreased sensitivity to axial misalignment of the probe inside the collar bore when the axial length of one of the antennas is extended to provide larger tolerance of axial alignment of the two antennas. Yet another advantage is that no pressure feed-thrus are required to route wiring between the probe and the collar.

A feature of the present invention is that the apparatus uses electromagnetic radiation to establish the communication link. Another feature is that the probe and drill-collar instrumentation are in completely separate pressure containers reducing the risk of flooding both devices should one pressure container develop a leak. Yet another feature is that there are fewer mechanical intrusions into the fluid flowing through the center of the drill collar.

DETAILED DESCRIPTION OF THE PREFERRED EMBODIMENTS

Figure 1:
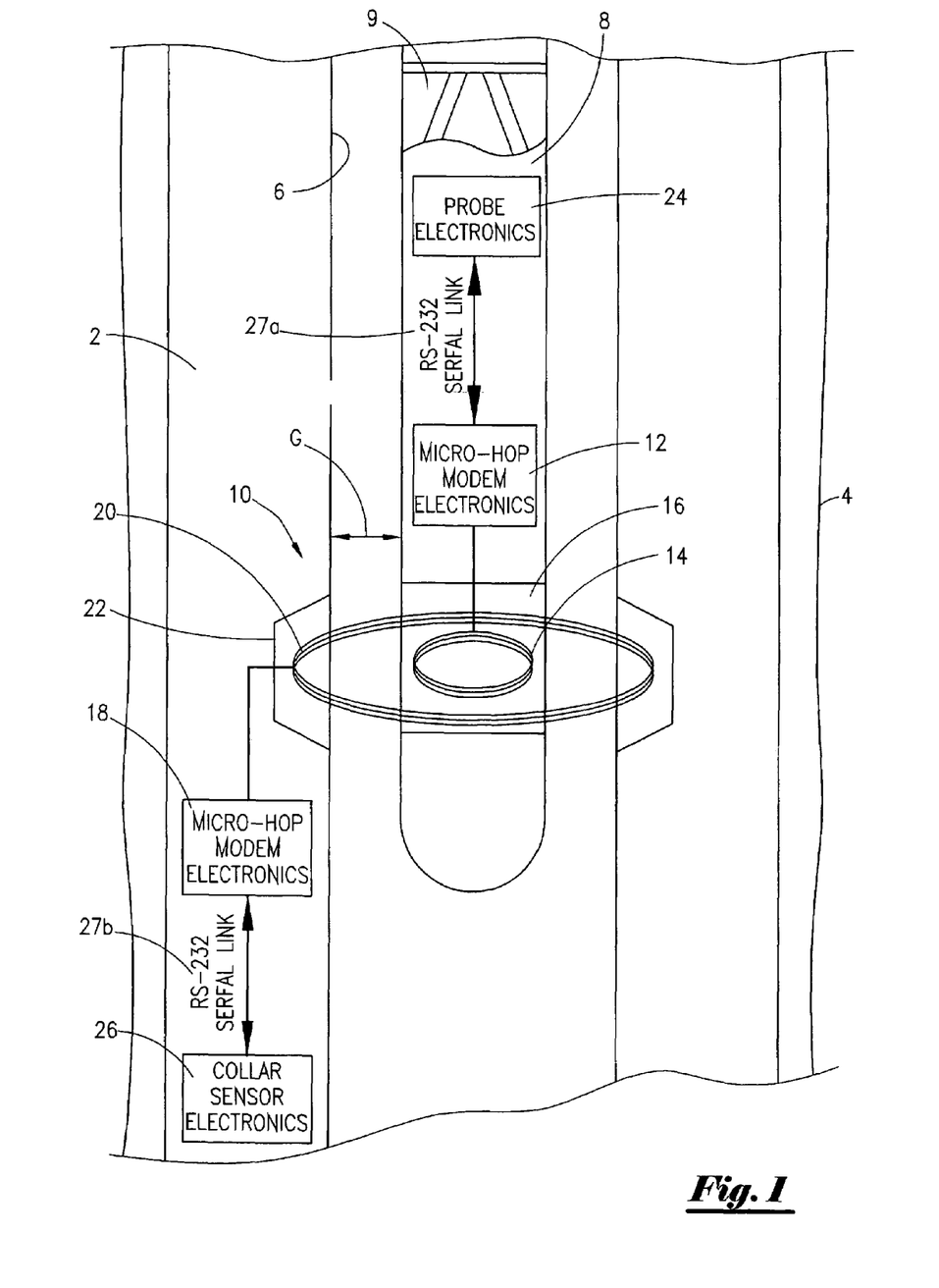
FIG. 1 is a perspective block diagram of the most preferred embodiment of the present invention.

Referring now to FIG. 1, a perspective block diagram of the most preferred embodiment of the present invention will now be described. As shown in FIG. 1, a tubular member 2, such as a drill collar, is disposed within a well bore 4. The drill collar 2 has an internal diameter portion 6, and wherein the probe 8, which is generally cylindrical, is slidably disposed within the internal diameter portion 6. The drill collar 2 may be connected to a drill bit used for boring a bore hole. The probe 8 may be operatively associated with a MWD tool or LWD tool (not shown). As those of ordinary skill in the art will appreciate, the MWD tool can create a pressure pulse that duplicates a digital code transmission thereby allowing the transmission of down hole data to the surface. MWD and LWD tools are commercially available from Baker Hughes Inc. It should also be noted that the probe 8 may be connected via a hard wired cable, known in the industry as electric line, and wherein the transmission path of the electrical signals is the electric line. The pressure pulse valve is denoted by the numeral 9.

FIG. 1 depicts the apparatus, seen generally at 10, and wherein the apparatus 10 consists of two modem electronic modules and two antennas. More specifically, the first modem electronics module 12 and the probe antenna 14 are located in the probe 8. The probe antenna 14 is located on the outer periphery of the probe 8, underneath a non-conducting sleeve 16. This non-conductive sleeve 16 protects the probe antenna 14 from the drilling fluid flowing through the internal diameter portion 6 of the drill collar 2.

The apparatus 10 further includes a second modem electronics module 18 and drill collar antenna 20 (sometimes referred to as the tubing antenna 20) located in the drill collar 2. The drill collar antenna 20 is located in a pocket 22 on the inside diameter portion of the drill collar 2. This pocket 22 is filled with a non-conducting material that covers the drill collar antenna 20 and protects it from the drilling fluid flowing through the inside of the drill collar 2. Because the sleeve 16 covering the probe antenna 14 and the pocket material covering the drill-collar antenna 20 are non-conductive, electromagnetic (EM) signals can pass between the two antennas and allow a wireless data communications link to be established between the probe electronics 24 and the sensor electronics 26. The probe electronics 24 allow for the processing, storage and bidirectional transmission of data with the first modem electronics module 12. The sensor electronics 26 collects information received from the various types of down hole sensors available such as resistivity, gamma ray, pressure, etc., and the sensor electronics 26 further allows for the bidirectional transmission of this data with the second modem electronics module 18.

In the most preferred embodiment, the first modem electronic module 12 and second modem electronic module 18 of the apparatus-system 10 will use the same electronic design. This allows the same modem module to be used for either position in the down hole tool. The connection between the modem electronic modules and the rest of the down hole tool system will utilize a Universal Asynchronous Receiver Transmitter (UART) interface. Thus, the sensor electronics 26 will employ a UART chip and the probe electronics 24 will also employ a UART chip. The interface between the electronic modules and the modem modules will employ the RS-232 standard for serial communication, as seen by the link 27a between the probe electronics 24 and the first modem electronics module 12, as well as the RS-232 link 27b between the sensor electronics 26 and the second modem electronics module 18. In this configuration, the apparatus 10 operates as a simple modulator-demodulator (modem) transferring the transmit data and the receive data signals of the UART interface across the EM link. The signal levels on the UART interface will be +5V logic levels, allowing the modem modules (namely modem electronics modules 12, 18) to be wired directly to standard UART that are embedded in most microprocessors.

Attenuation of EM signals propagating in the internal bore of a drill-collar can be extremely high. As a result, and as per the teachings of the present invention, there should be some axial overlap of the probe antenna 14 and the drill collar antenna 20. In the most preferred embodiment, the probe antenna 14 and the drill collar antenna 20 will be located coaxial with the axial center points of the antennas located in the same plane, as seen in FIG. 1. This configuration reduces the EM signal attenuation and provides the lowest error rate possible for the data transmitted through the apparatus system 10.

Figure 2A:
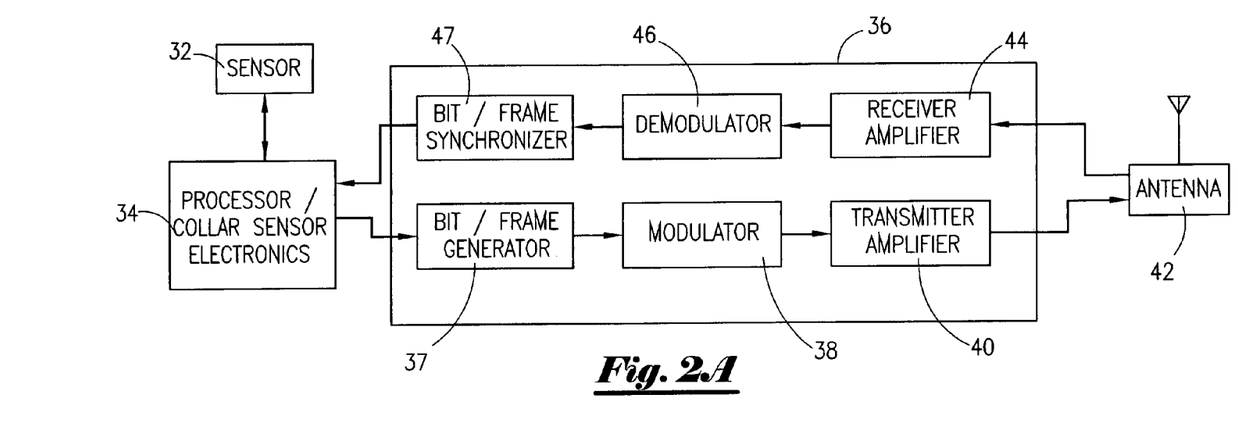
FIG. 2A is a block diagram of one of the preferred embodiments of the drill collar electronics.

Referring now to FIG. 2A, a block diagram of one of the preferred embodiments of the drill collar electronics will now be described. It should be noted that like numbers appearing in the various figures refer to like components. More specifically, a sensor 32 will collect data such as resistivity of the formation fluids. The sensor 32 may also collect information on the gamma ray counts of the formation, the pressure of the well bore, and other properties as well understood by those of ordinary skill in the art. The sensor 32 is physically located within the drill collar. The sensor 32 may include a circuit means for collecting an analog signal and generating a record. The data collected by the sensor 32 is transmitted to the collar sensor electronics 34, and wherein the collar sensor electronics 34 includes a processor for receiving a reading generated by the sensor, processing the data signals from the sensor 32, and generating a digital output. The digital data will then be sent to the modem 36 (sometimes referred to as a transceiver 36).

As seen in FIG. 2A, the modem means 36 includes a bit frame generator 37 that receives the digital data and formats the serial data stream for a modulator 38 that in turn will deliver the signal to the transmitter amplifier 40. In turn, the analog signal will be delivered to the antenna 42, wherein the antenna 42 is a radio frequency transducer. The antenna 42 is a coil of wire and the antenna will transmit the electromagnetic waves to a receiving antenna seen in FIG. 2B.

Figure 10:
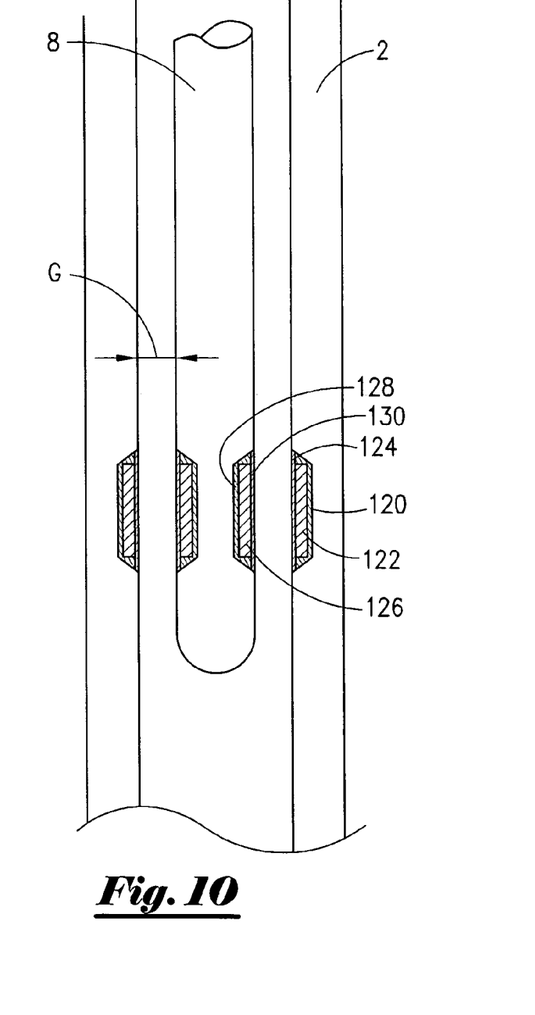
FIG. 10 is a partial cross-sectional view of the preferred antenna construction embodiment.

Referring now to FIG. 10, a cross-sectional diagram of one of the preferred embodiments of the antenna is illustrated. As per the teachings of the present invention, the antennas are wound on coil forms fabricated with a non-metallic or non-conductive material such as fiberglass or polyetheretherketone (PEEK). As shown in FIG. 10, the probe 8 is disposed within the drill collar 2. This view shows the non-metallic coil form 120 disposed about the drill collar 2, as well as the antenna windings 122 disposed on the outer periphery of the drill collar 2. As seen in FIG. 10, the non-metallic shield 124 covers and shields the antenna windings 122.

FIG. 10 also shows the probe antenna windings 126, placed about the non-metallic coil form 128. FIG. 10 further depicts the non-metallic shield 130 for covering the antenna winding 126. Winding the wire of the antenna on this type of coil form reduces eddy current losses and improves the efficiency of the antenna by spacing the antenna away from the conductive materials of the collar and probe. The antennas are constructed without the use of soft ferro-magnetic materials like soft iron or ferrite. Soft ferro-magnetic materials are typically used to concentrate the magnetic field through the coil windings and increase the inductive coupling between the two antennas. Eliminating the requirement for ferro-magnetic materials to enhance the inductive coupling between the antennas simplifies the construction of the antennas and also allows a significant gap (such as "G" as seen in FIG. 10) to be used between the collar and probe antennas. This gap between the two antennas provides a path for the drilling fluids that flow down the center of the collar.

Also, prior art devices that use soft ferro-magnetic materials to direct and concentrate the magnetic field between the two antennas require relatively precise axial alignment of the two coils in order for the device to operate properly. In the most preferred embodiment, the antennas of the present invention are manufactured from copper. Eliminating the need for these ferro-magnetic materials in this antenna design allows a larger tolerance for alignment of the coils and makes the system more tolerant to axial misalignment of the two antennas.

Returning to FIG. 2A, the system herein described is also bidirectional. Hence, the antenna 42 can also receive electromagnetic waves and directed the analog signal to the modem means 36, and in particular to the receiver amplifier 44. The resulting signal is therefore amplified with the receiver amplifier 44. The signal is then demodulated and converted to a digital signal in the demodulator 46. The demodulated signal would then be transmitted to the bit/frame synchronizer 47 which formats the serial data stream and thereafter the digital data stream is transmitted to the collar sensor electronics module 34. The digital signal may be a command to poll the sensor 32, in which case the sensor 32 can take a reading, and wherein the sensor 32 would collect the data and in turn send the data to the collar sensor electronics module 34. The process of generating a corresponding electromagnetic wave with antenna 42 is the same as previously described.

Figure 2B:
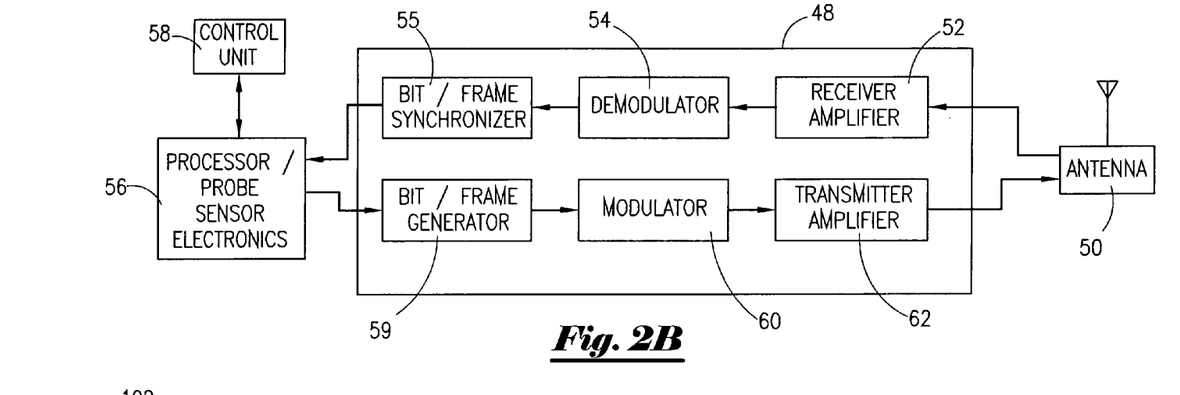
FIG. 2B is a block diagram of one of the preferred embodiments of the probe electronics.

Referring now to FIG. 2B, a block diagram of the one of the preferred embodiments of the probe electronics, including the probe modem means 48 (sometimes referred to as a transceiver 48), will now be described. The antenna 50 will receive the electromagnetic wave generated from the antenna 42 (seen in FIG. 2A) and wherein antenna 50 is a radio frequency transducer similar in construction to antenna 42. Returning to FIG. 2B, the antenna 50 is electrically connected to the modem means 48, and wherein the modem means 48 is similar in construction to the previously mentioned modem means 36. The modem means 48 includes receiver amplifier 52 which receives the signal from the antenna 50 and amplifies the analog signal. The receiver amplifier 52 in turn delivers the signal to a demodulator 54. The demodulated signal would then be transmitted to the bit/frame synchronizer 55 which formats the serial data stream and thereafter the digital data stream is transmitted to the probe electronics module 56. The probe electronics module 56, which may include a processor for storing and processing the data can then send the data to a control unit 58. The control unit 58 may be located at the surface. The control unit 58 may communicate with the probe electronics module 56 via a hard wire (such as a electric line cable) or may transmit pressure pulses via MWD or LD techniques, as previously described. In the most preferred embodiments, the antenna 50 is a coil of wire as previously described with reference to FIG. 10, which uses a copper wire in the preferred embodiment.

In accordance with the teachings of the present invention, communications may be bidirectional. Hence, probe electronics module 56 can send a signal to the modem means 48. It should be noted that the operator may institute this transmission via the control unit 58. More specifically, a bit/frame generator 59 of the modem means 48 receives the digital data from probe electronics module 56 and formats the serial data stream for the modulator 60 which will modulate the data stream, and wherein the modulated analog signal can then be directed to transmitter amplifier 62 for amplification. The modulated signal data is then sent to the antenna 50 which generates the electromagnetic signal that will be received by the antenna 42 seen in FIG. 2A.

Figure 3A:
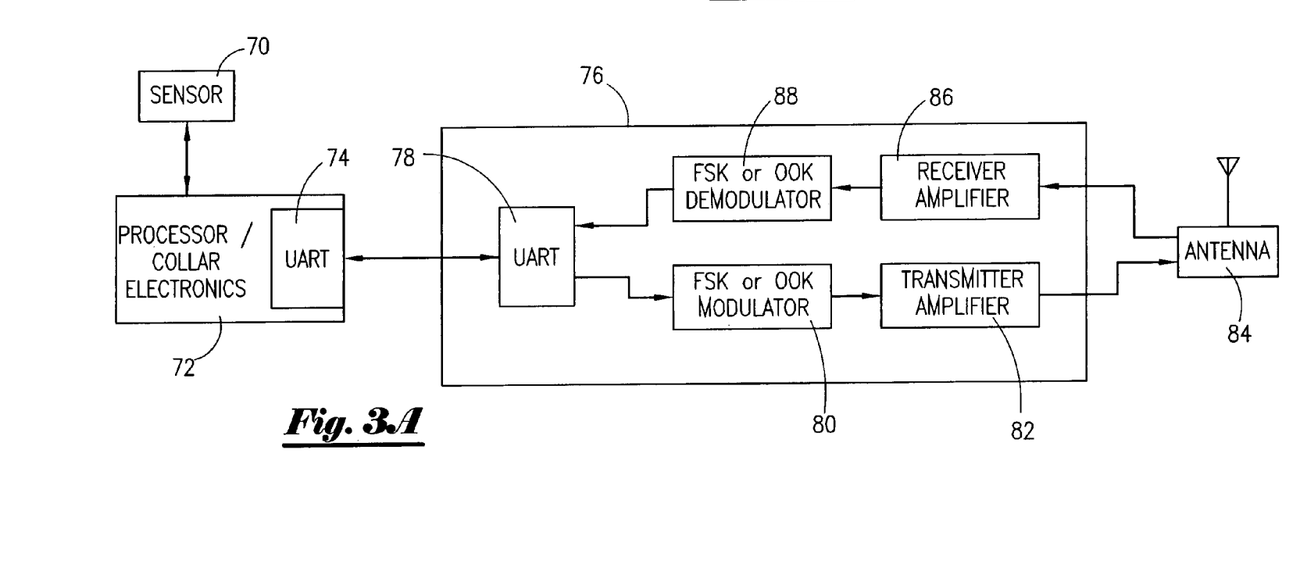
FIG. 3A is a block diagram of the most preferred embodiment of the drill collar electronics.

Referring now to FIG. 3A, a block diagram of the most preferred embodiment of the drill collar electronics will now be described. In this embodiment, the sensor means 70 collects information such as a resistivity measurement, gamma ray count, and/or pressure reading, and in turn directs that information to the drill collar sensor electronics module 72. As noted earlier, the drill collar sensor electronics module 72 contains a processor for collecting, storing and processing the information from the sensor 70. The drill collar sensor electronics module 72 further contains a UART 74, and wherein the UART 74 converts the parallel digital information to a serial data stream.

The serial data stream is directed to the first modem means 76, and wherein the first modem means 76 is also sometimes referred to as transceiver 76. The first modem means 76 contains the UART 78 that receives the digital data stream from UART 74 based on the RS-232 standard protocol which in turn directs the signal to the modulator 80 and wherein the modulator 80 can be either a frequency shift keying modulating scheme or an on-off keying scheme as understood by those of ordinary skill in the art. The modulated signal is then directed to the transmitter amplifier 82 which amplifies the modulated signal for transmission by the antenna 84. The antenna 84 is of similar construction as the antennas previously discussed which generates an electromagnetic wave signal representative of the information collected by the sensor 70.

According to the teachings of the present invention, the apparatus is bidirectional. Hence, it is possible that the antenna 84 receive propagating electromagnetic signals and wherein the received signals are directed to the receiver amplifier 86 which in turn amplifies and directs the analog signal to the demodulator 88. The received electromagnetic signal may be a command for the sensor to take sample readings. The demodulator 88 can use either the frequency shift keying method or the on-off keying method, depending on the modulating scheme of the transmitter, as previously noted. The demodulated signal is then directed to the UART 78 for serial data transmission to the UART 74 on the collar sensor electronics module 72 based on the RS-232 standard protocol. The processor can then communicate the command for the sensor 70 to obtain a reading. The reading can then be taken and wherein the reading can then be sent to the probe as previously described.

Figure 3B:
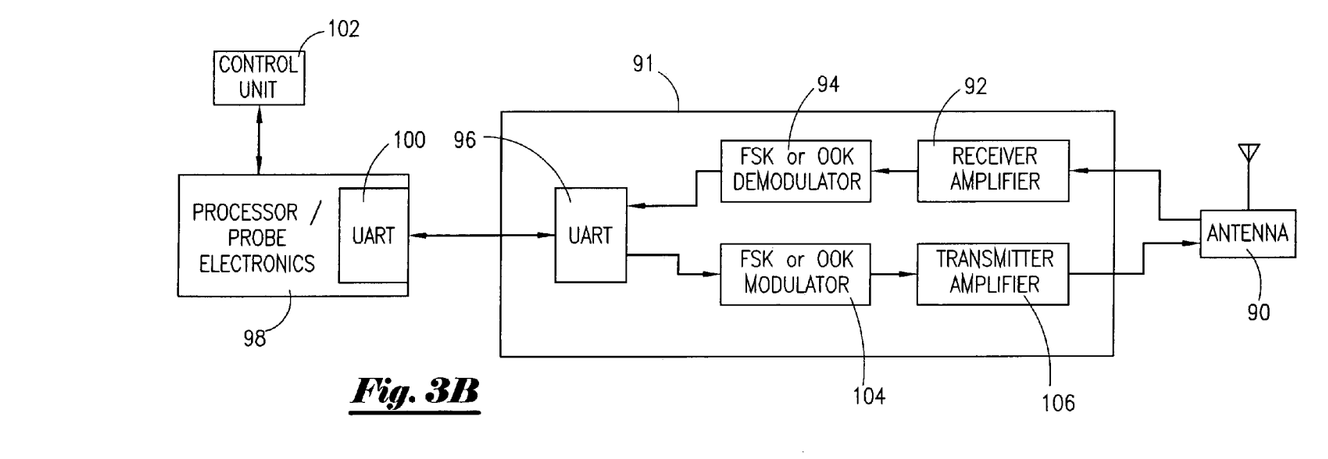
FIG. 3B is a block diagram of the most preferred embodiment of the probe electronics.

Referring now to FIG. 3B, a block diagram of the most preferred embodiment of the probe electronics will now be described. As noted in the discussion of FIG. 3A, the antenna 84 will generate an electromagnetic signal, and wherein that EM signal will be picked up by the antenna 90. The antenna 90 is of similar construction of the antennas previously discussed. The signal will in turn be directed to the modem means 91 (also sometimes referred to as a transceiver 91). More specifically, the signal is directed to the receiver amplifier 92, and wherein the receiver amplifier 92 will then amplify and direct the analog signal to the demodulator 94. The demodulator 94 can be either the frequency shift keying modulating scheme or the on-off keying scheme, depending on the transmitting modulating scheme. The demodulator 94 will then direct the signal to the UART 96. A hard wired connection will exist between the modem means 91 and the probe electronics module 98. More specifically, the probe electronics module 98 contains the UART 100 that receives the digital serial communication from the UART chip 96 and wherein the RS 232 standard is used. A processor is contained within the probe electronics module 98 and the UART 100 can convert the serial data stream to a parallel data stream for the processing by the processor. The probe electronics module 98 can communicate with the control unit 102, and wherein the communication path may be a hardwired connection or may be a pressure pulse telemetry type of system, as previously noted.

In accordance with the teachings of this invention, the system is bidirectional. Hence, an operator can generate a signal from the control unit 102, which will in turn be sent to the probe electronics module 98. The UART 100 will then serially transmit the serial data stream to the modem means 91. More specifically, the serial data stream will be received by the UART 96 which in turn will direct the signal to the modulator 104. The modulator 104 can employ either frequency shift keying modulating or an on-off keying. The modulated signal will then be directed to the transmitter amplifier 106 for amplification. The analog signal can then be transmitted to the antenna 90 and wherein the antenna 90 will generate the EM signal as previously described, which in turn will be received by the antenna 84.

Figure 4:
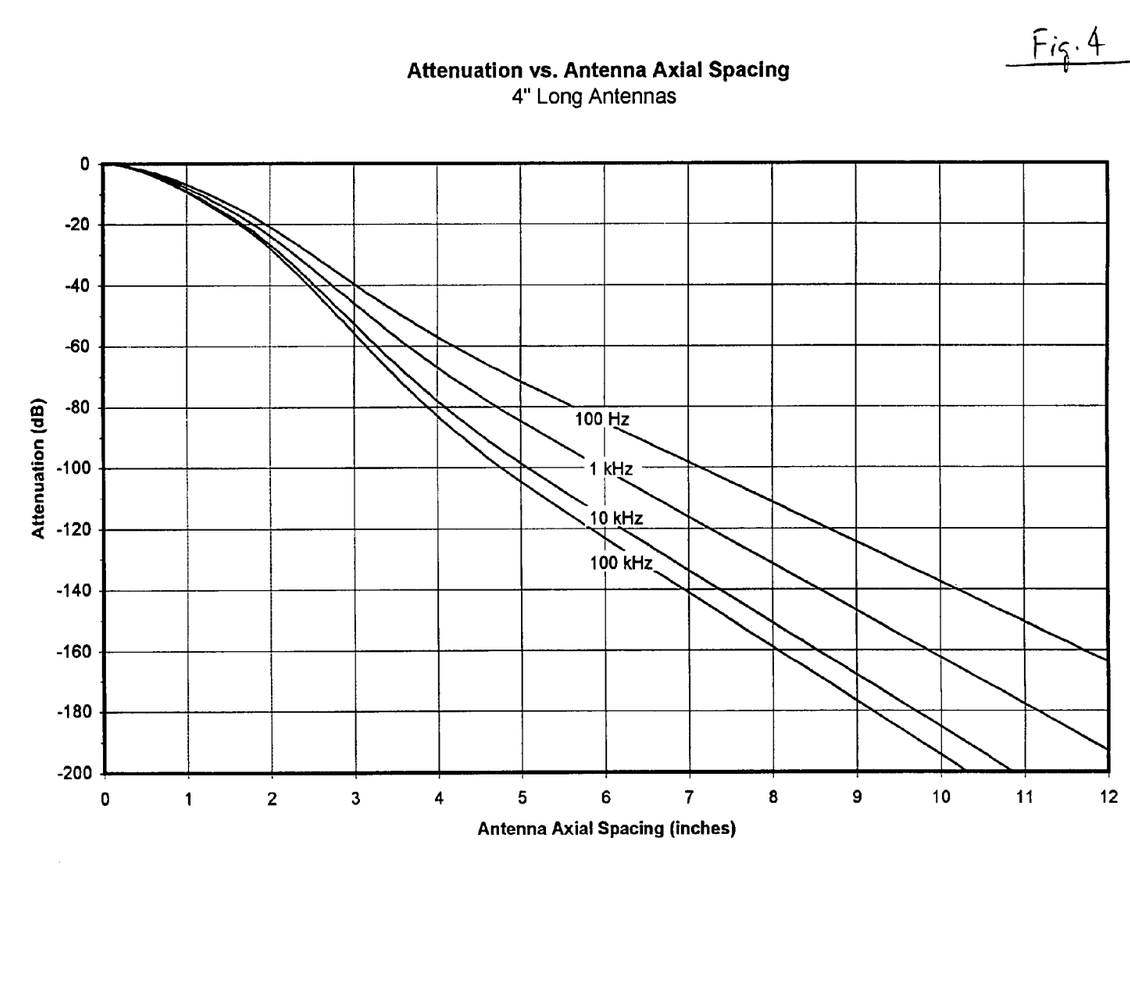
FIG. 4 is a graph of signal attenuation as a function of axial antenna spacing.

Referring now to FIG. 4, the empirical results of the attenuation of the received signal relative to the axial separation of the antennas are shown. Note that the empirical results graphed in FIGS. 4 through 8 were utilizing four inch long antennas. In FIG. 4, the attenuation of the received signal relative to the coaxial case has been calculated for operating frequencies of 100 Hz, 1.0 kHz, 10.0 kHz and 100 kHz. The axial length of the antennas used for the cases shown is 4 inches. The antenna axial spacing is the horizontal distance from the center of one antenna to the center of the second antenna, as will be more fully explained later in the disclosure. As illustrated in FIG. 4, the attenuation of the signal propagating in the internal bore of the drill-collar is severe.

The signal levels drop off by approximately 200 dB per foot as the center-to-center axial spacing of the antennas is increased. As a result, the most preferred operation of the wireless link is with center-to-center axial spacings of the antennas less than the total length of the antennas. This provides some axial overlap of the two antennas and minimizes signal attenuation.

Figure 5:
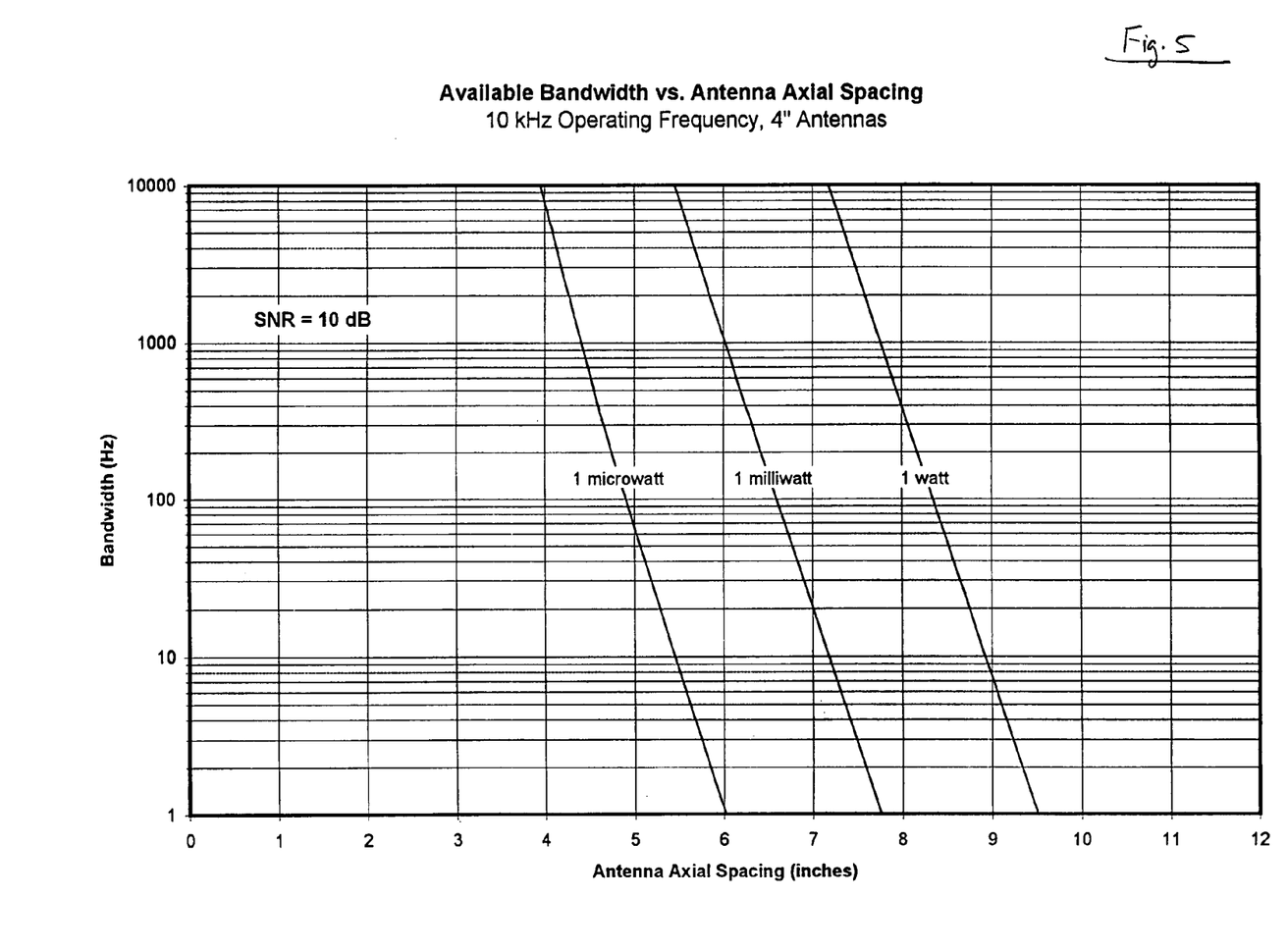
FIG. 5 is a graph of the available bandwidth at a 10,000 Hertz operating frequency for a 10 dB Signal-To-Noise ratio (SNR) as a function of axial antenna spacing for three transmitter power levels.
Figure 6:
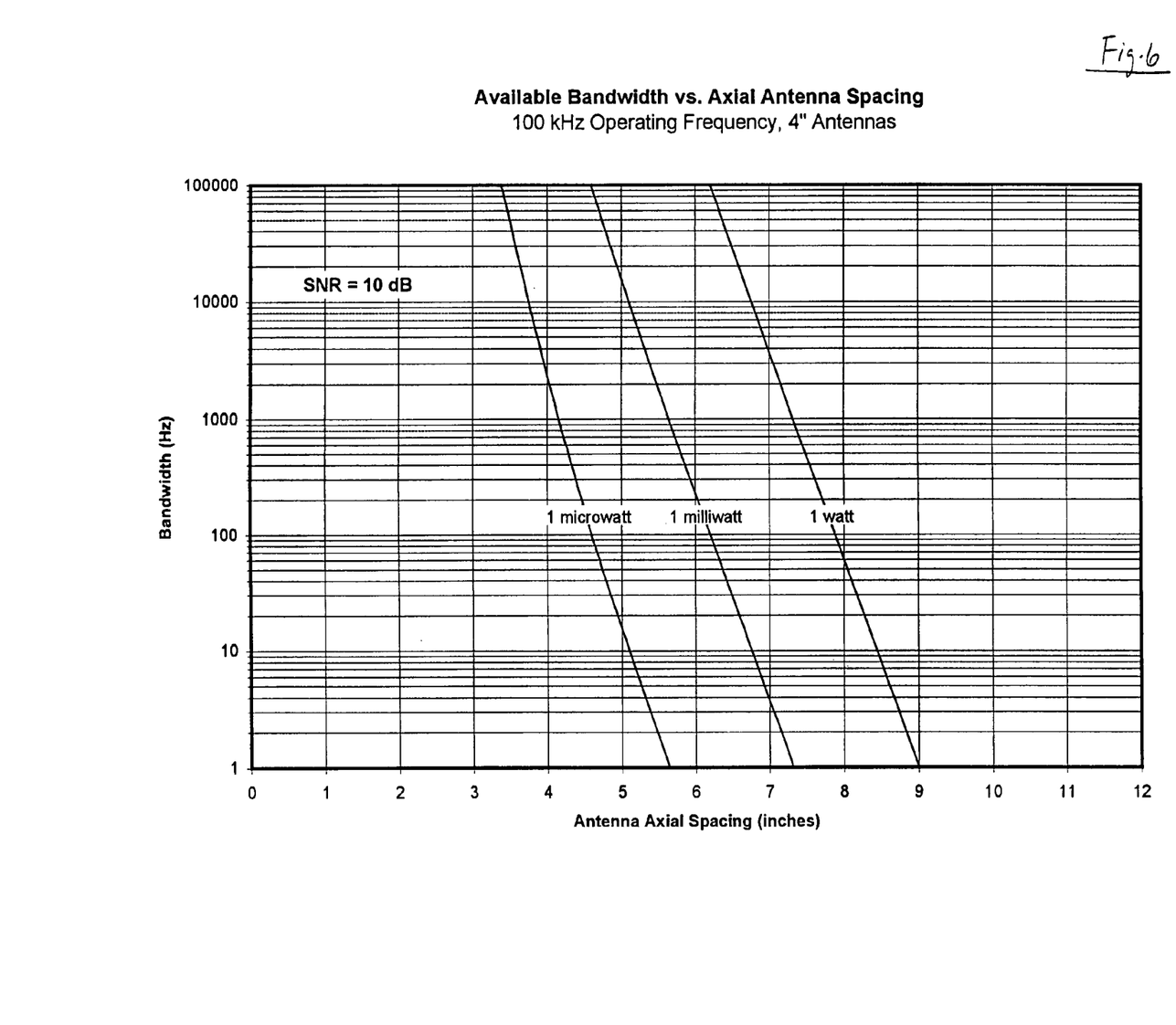
FIG. 6 is a graph of the available bandwidth at a 100,000 Hertz operating frequency for a 10 dB Signal-To-Noise ratio (SNR) as a function of axial antenna spacing for three transmitter power levels.

The amount of power required by the apparatus system 10 to provide good data transmission has also been analyzed. Two cases were analyzed. The first case was the amount of bandwidth provided for a 10 dB signal-to-noise ratio (SNR) as a function of axial antenna spacing. A SNR of 10 dB is typically required for most high-performance synchronous data communication systems. The 10 dB results for two operating frequencies are shown in FIGS. 5 and 6. Note that the antenna axial spacing of the horizontal axis represents the distance from the center of one antenna to the center of the second antenna. As illustrated in the figures, good performance can be achieved with reasonable transmitter power levels and antenna spacings. The two figures also illustrate the effect of the high rate of attenuation inside the drill collar bore. Increasing the transmitter power by a factor of 10 only provides an additional 1 to 2 inches of antenna spacing.

Figure 7:
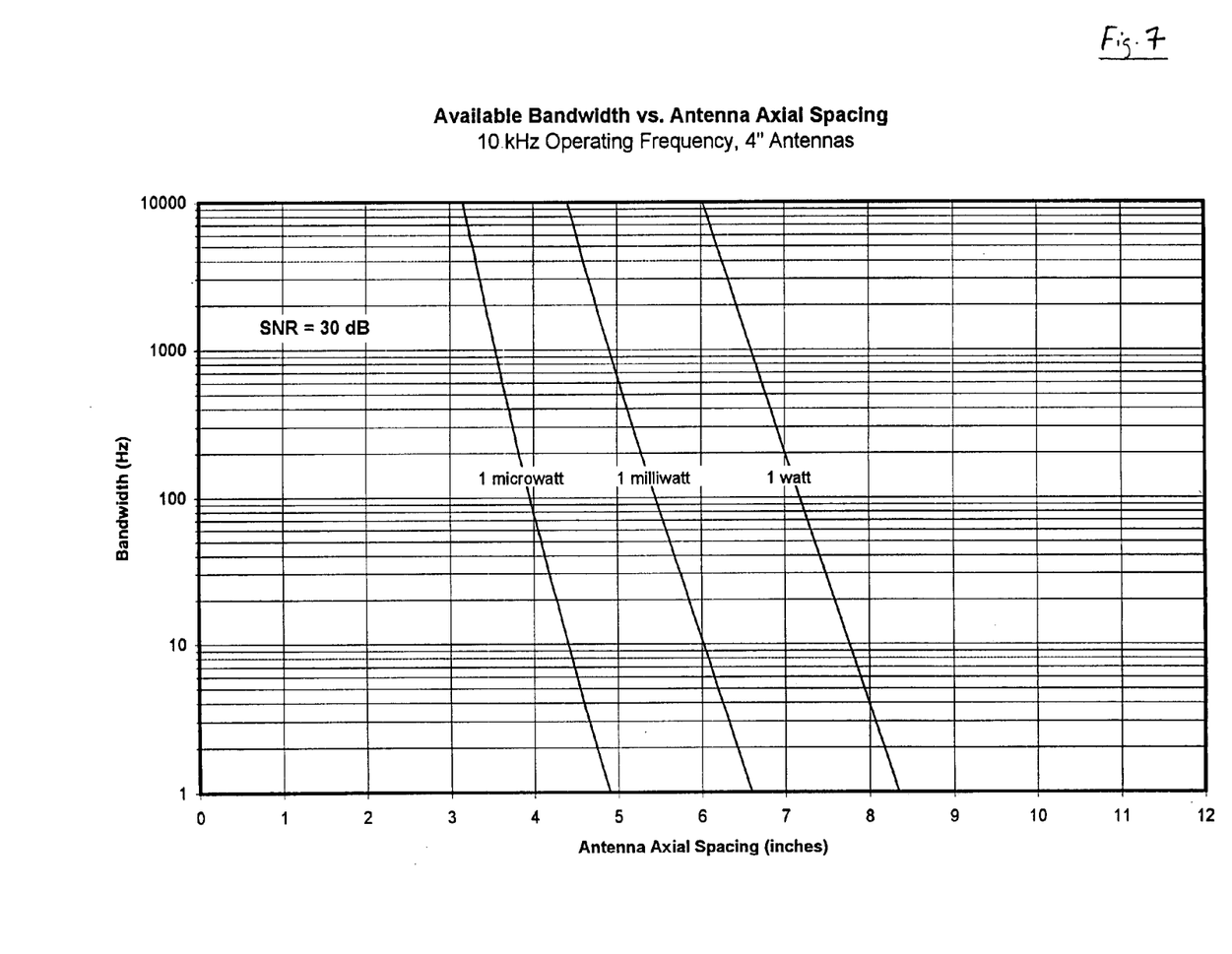
FIG. 7 is a graph of the available bandwidth at a 100,000 Hertz operating frequency for a 30 dB Signal-To-Noise ratio (SNR) as a function of axial antenna spacing for three transmitter power levels.
Figure 8:
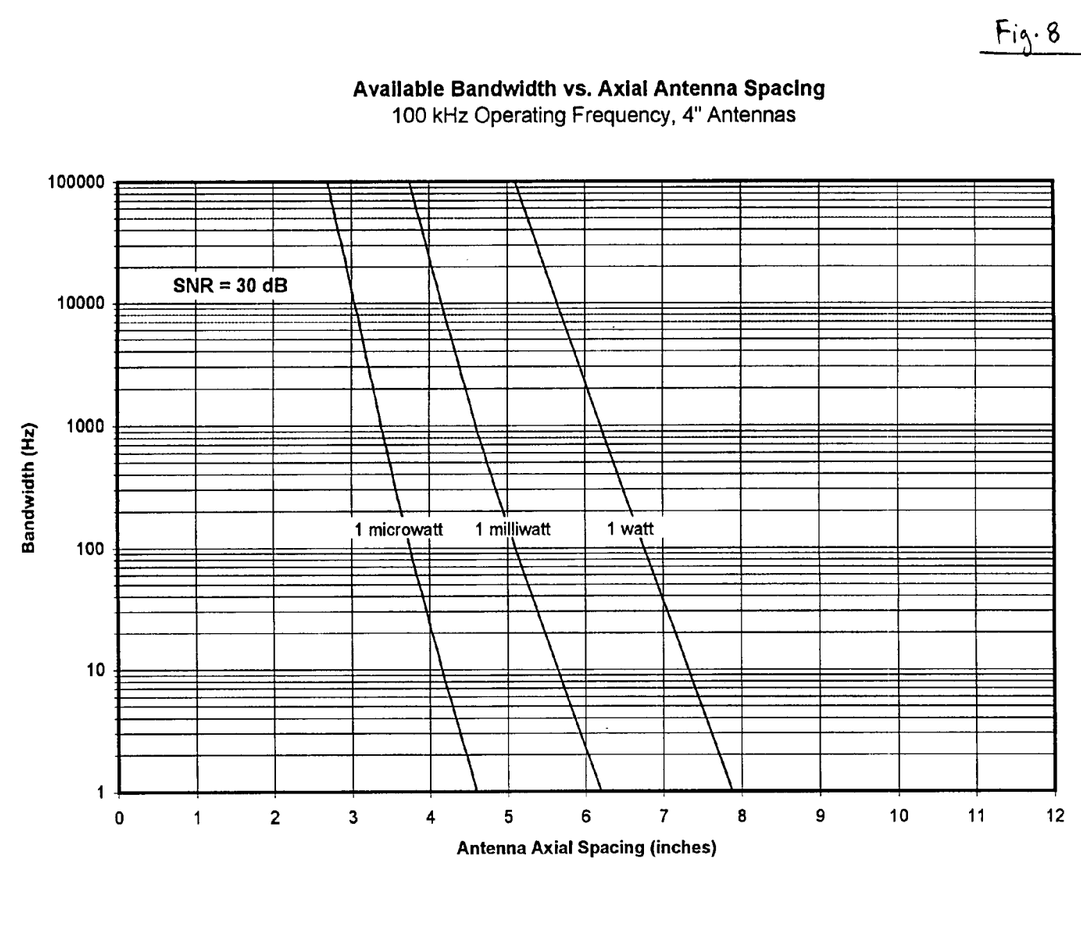
FIG. 8 is a graph of the available bandwidth at a 100,000 Hertz operating frequency for a 30 dB Signal-To-Noise ratio (SNR) as a function of axial antenna spacing for three transmitter power levels.

With reference to FIGS. 7 and 8, the second case that has been analyzed is the amount of bandwidth provided for a 30 dB SNR as a function of axial antenna spacing. With a SNR of 30 dB, a much simpler asynchronous data communications systems can be employed for the wireless link. FIGS. 7 and 8 present the 30 dB results for two operating frequencies. As expected, increasing the SNR requirements from 10 dB to 30 dB only reduces the required antenna spacing by approximately 1 inch. Empirically, it has been shown that using a 1 mW transmitter operating at 10 kHz, a spacing of 6 inches will provide a signal bandwidth of 1000 Hz with a SNR of 10 dB. For a 30 dB SNR, this spacing is reduced from 6 inches to 4.9 inches at the 1 mW, 1000 Hz bandwidth point (as seen in FIG. 7). This is a reduction of only 11.1 inches.

Based on the results of the test, it has been found that the wireless system link can be implemented with relatively low power. Power levels on the order of 1 mW will provide adequate performance. Also, for the most preferred embodiment, the axial antenna spacings should be such that there is some overlap of the two antennas.

The testing also shows that signal attenuation does not increase dramatically with operating frequency. As a result, the operating frequency of the apparatus can be made as high as 10 kHz or 100 kHz. Increasing the operating frequency has the advantage of making the system immune to noise that is mechanically induced by the drilling operation. The mechanically induced noise should be virtually eliminated at frequencies above 5 kHz.

A simple, robust, asynchronous communication system can be used for the apparatus 10 link without compromising the performance of the system. The high SNR requirements for the asynchronous link will only reduce the effective range of allowed axial antenna spacings by approximately 1 inch. A simple asynchronous system will reduce the complexity and size of the module electronics and also provide a simple user interface. The most preferred system for the apparatus is the standard RS-232 serial transmission protocol. This allows the use of a simple UART for the interface to the electronics module.

In addition to allowing the use of a simple asynchronous communication system, providing a high SNR also allows the use of simplified modulation schemes. Although any of the standard modulation schemes used by communication systems can be used in the system, simple modulation schemes such as frequency shift keying (FSK) or on-off keying (OOK) can be employed for the disclosed modem. These modulations schemes are less complicated to implement than the higher performance modulation schemes such as Phase Shift Keying (PSK), Multi-Phase Shift Keying (MPSK), Multiple Amplitude Phase Shift Keying (MAPSK), etc. and can offer similar performance with a relatively small decrease in axial antenna separation without increasing the required transmitter power.

In applications where the axial placement of the probe inside the drill collar bore can vary with some uncertainty, the length of one or both of the antennas may be extended to decrease the sensitivity of system performance on axial misalignment of the probe and collar antennas. FIG. 9 illustrates this concept. As shown in the figure, the length of the probe antenna can be made longer than the collar antenna. In this configuration, the axial location of the probe within the central bore of the drill collar can vary over a significantly larger interval. As long as there is some overlap of the two antennas, the coupling between the two antennas will be sufficient to provide good system performance. In a similar manner, the length of the collar antenna could be made longer than the probe antenna. Just as in the case illustrated in FIG. 9, as long as there is some overlap between the collar and probe antennas the coupling between the antennas will be adequate for good performance.

Figure 9A:
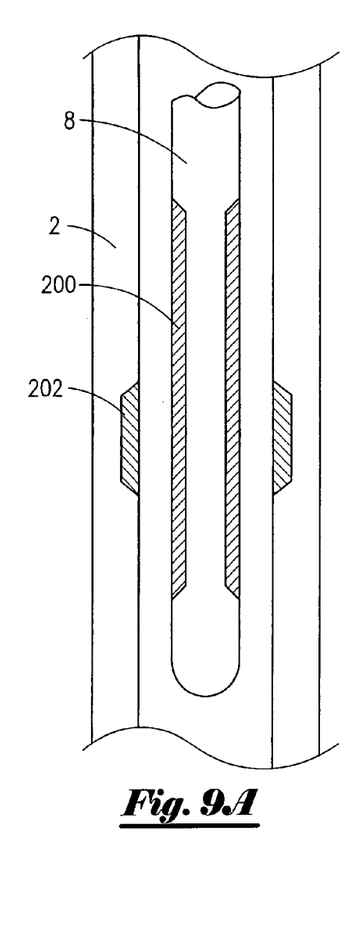
FIG. 9A is a schematic illustration of the probe antenna centrally aligned with the collar antenna.

Referring now to FIG. 9A, a schematic illustration of a probe antenna 200 centrally aligned with the collar antenna 202. More specifically, the probe antenna 200 is disposed about the probe 8, and the collar antenna 202 is disposed about the inner portion of the collar 2, as previously noted. As shown, the length of the antenna windings of the probe antenna 200 is longer than the length of the antenna windings of the collar antenna, and wherein the probe antenna 200 is positioned in the collar bore with the center of the antennas aligned.

Figure 9B:
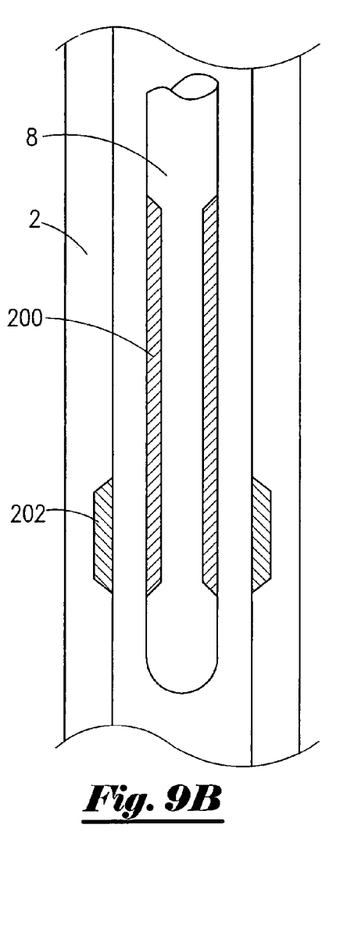
FIG. 9B is a schematic illustration of the center of the probe antenna being higher than the center of the collar antenna.
Figure 9C:
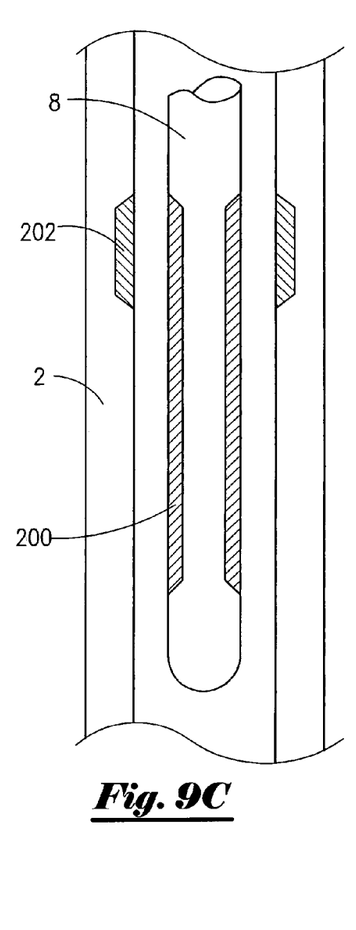
FIG. 9C is a schematic illustration of the center of the probe antenna being lower than the center of the collar antenna.
Figure 9D:
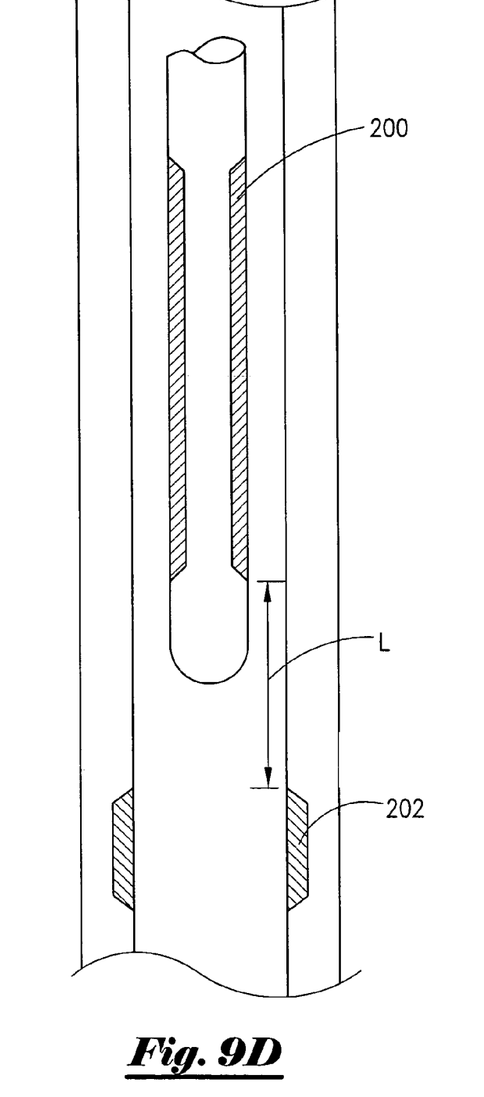
FIG. 9D is a schematic illustration of the probe antenna being axially separated from the collar antenna

In FIG. 9B, a schematic illustration of the center of the probe antenna being higher than the center of the collar antenna is shown. In other words, the probe antenna 200 is positioned in the collar bore with the center of the probe antenna 200 higher than the collar antenna 202. It should be noted, however, that in the position shown in FIG. 9B, there is still no axial separation and instead depicts an axial overlap between the probe antenna 200 and the collar antenna 202. Referring now to FIG. 9C, a schematic illustration of the center of the probe antenna 200 being lower than the center of the collar antenna 202 is shown. FIG. 9C also depicts the axial overlap. In FIG. 9D, a schematic illustration of the probe antenna being axially separated from the collar antenna 202 by a distance "L". FIG. 9D depicts a scenario where there is no axial overlap between the probe antenna 200 and the collar antenna 202. Hence, as shown in FIG. 9D, as the distance "L" increases, the attenuation of the signal increases. However, in accordance with the teachings of the present invention, by having an extended probe antenna winding (such as shown in FIG. 9A,), the disclosed embodiments allow for greater misalignment of probe antenna 200 relative to the collar antenna 202. In other words, extending the probe antenna allows for greater misalignment of the two antennas when dealing with problems associated with the varying lengths of collars and probes and the location of the hardware used to position the probe inside the collar bore.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. An apparatus for wirelessly communicating characteristics of a down hole environment in a tubular string, with the tubular string being concentrically positioned within a well bore and said well bore containing a drilling fluid, the tubular string being a conductive material and wherein the tubular string has an inner diameter portion, the apparatus comprising:
   a sensor means, positioned within a pocket in the tubular string, for collecting information of the characteristic and processing the information;
   a sensor electronics module electrically connected to said sensor means;
   a first modem means for modulating the information from the sensor module;
   a sensor antenna coil winding, electrically connected to said first modem means, for generating a modulated electromagnetic wave said sensor antenna coil winding positioned within an inner pocket formed on said inner diameter portion;
   a probe concentrically positioned within the tubular string;
   a probe antenna coil winding, disposed within the probe, for receiving the modulated electromagnetic wave and generating an output wherein said probe antenna coil winding concentrically positioned about said outer periphery so that a gap is formed between said sensor antenna coil winding and said probe antenna coil winding forming a passage for the drilling fluid and for the transmission of the modulated electromagnetic wave;
   a second modem means for demodulating the electromagnetic wave received from said sensor means.

2. The apparatus of claim 1 further comprising a probe electronics module electrically connected to said second modem means.

3. The apparatus of claim 2 wherein said sensor means includes a circuit means for collecting an analog signal and generating a record.

4. The apparatus of claim 2 wherein an operating frequency range of said sensor antenna and said probe antenna is between 1,000 hertz and 100,000 hertz.

5. The apparatus of claim 4 wherein the connection between the first modem means and the sensor electronics module is a universal asynchronous receiver/transmitter (UART) interface.

6. The apparatus of claim 5 wherein the protocol of the UART interface is the RS 232 standard.

7. The apparatus of claim 6 wherein there is some axial overlap of the probe antenna and the sensor antenna.

8. The apparatus of claim 7 wherein the probe antenna has a first axial length and the sensor antenna has a second axial length, and wherein the first axial length of the probe antenna is longer than the second axial length of the sensor antenna to reduce the sensitivity to axial misalignment of the two antennas.

9. The apparatus of claim 7 wherein the probe antenna has a first axial length and the sensor antenna has a second axial length, and wherein the second axial length of the sensor antenna is longer than the first axial length of the probe antenna to reduce the sensitivity to axial misalignment of the two antennas.

10. The apparatus of claim 9 wherein the tubular string has contained therein a fluid column, and wherein the probe electronics module drives a fluid valve that transmits fluid pressure pulses indicative of the collected information from the sensor means.

11. A method for communicating a sensor located within a tubing string with a probe concentrically disposed within the tubing string, said tubing string containing a drilling fluid, wherein said tubing string containing an internal diameter portion and said probe having an outer periphery, the method comprising:
   providing the sensor within the tubing string, the tubular string being a conductive material;
   generating a reading from the sensor;
   transmitting the reading to a first modem means;
   modulating the reading onto a carrier wave to produce a modulated signal;
   directing the modulated signal to a tubing string antenna coil winding, said tubing string coil winding disposed about the inner diameter portion located within the tubing string;
   generating an electromagnetic signal with the tubing string antenna coil winding in response to the reading from said sensor;
   receiving the electromagnetic signal with a probe antenna coil winding that is disposed about the outer periphery of said probe;
   demodulating the electromagnetic signal within a second modem means in the probe to the reading;
   transmitting the reading to a probe electronics module located within the probe.

12. The method of claim 11 wherein said sensor is selected from the group of resistivity sensors, gamma ray sensors, or pressure sensors.

13. The method of claim 12 wherein the step of generating the reading from the sensor includes collecting an analog signal within a circuit and generating a record from said analog signal.

14. The method of claim 12 wherein an operating frequency range of said tubing string antenna and said probe antenna is between 10,000 Hertz and 100,000 Hertz.

15. The method of claim 14 wherein an electrical connection between the second modem means and the probe electronics module is a universal asynchronous receiver/transmitter (UART).

16. The method of claim 15 wherein the protocol of the UART interface is the RS 232 standard.

17. The method of claim 16 wherein the probe antenna has a first length and the tubing string antenna has a second length, so that an axial overlap between the probe antenna and the tubing string antenna is formed which reduces the sensitivity to axial misalignment of the probe antenna and the tubing string antenna.

18. The method of claim 16 wherein the axial length of the probe antenna is longer than the axial length of the tubing string antenna to reduce the sensitivity to axial misalignment of the two antennas.

19. The method of claim 16 wherein an axial length of the tubing string antenna is longer than an axial length of the probe antenna.

20. A wireless system for communicating a sensor with a probe in a well bore, said well bore having a drilling fluid disposed therein comprising:
   a conductive metal housing concentrically positioned within said well bore, said housing containing the sensor and having an internal diameter portion therein, and wherein the probe is slidably disposed within said internal diameter portion;

a first processor means, disposed within said housing, for receiving a reading generated by the sensor and generating an output reading;

a first modem means, electrically connected with said first processor means, for modulating the output reading;

a housing antenna coil, electrically connected with said first modem means, for generating a modulated electromagnetic wave, said housing antenna coil disposed about said internal diameter portion;

a probe antenna coil, disposed about an outer periphery of said probe, for receiving the modulated electromagnetic wave so that a gap is formed between said sensor antenna coil winding and said probe antenna coil winding forming a passage for the drilling fluid and for the transmission of the modulated electromagnetic wave;

a second modem means, electrically connected with said probe antenna, for demodulating said modulated electromagnetic wave to the output reading;

a second processor means, electrically connected with said second modem means and positioned within said probe, for processing and recording the output reading into a digital record;

and wherein an operating frequency range of said housing antenna coil and said probe antenna coil is between 10,000 Hertz and 100,000 Hertz.

21. The apparatus of claim 20 wherein said probe antenna can generate modulated electromagnetic waves and wherein said housing antenna can receive the modulated electromagnetic waves.

22. The apparatus of claim 21 wherein said second processor means generates an output command that is received by said second modem means, and wherein said second modem means modulates the output command that is transmitted as a modulated electromagnetic wave by said probe antenna.

* * * * *